United States Patent [19]
Johnson

[11] Patent Number: 5,967,167
[45] Date of Patent: Oct. 19, 1999

[54] REMOTE CONTROLLED DRINKER SYSTEM

[75] Inventor: Dwight N. Johnson, Carlsbad, Calif.

[73] Assignee: CTB, Inc., Milford, Ind.

[21] Appl. No.: 09/130,217

[22] Filed: Aug. 6, 1998

[51] Int. Cl.[6] .................................................. F17D 3/01
[52] U.S. Cl. ...................... 137/14; 137/116.5; 137/238; 137/505.14; 137/883; 251/26; 119/72
[58] Field of Search .................................. 137/883, 869, 137/870, 505.14, 116.5, 238, 14; 119/72, 74; 251/30.01

[56] References Cited

U.S. PATENT DOCUMENTS

| | | | |
|---|---|---|---|
| 2,212,626 | 8/1940 | Thomas | 137/116.5 |
| 2,879,783 | 3/1959 | Taplin | 137/116.5 |
| 3,537,430 | 11/1970 | Peppler | 119/72 |
| 4,191,215 | 3/1980 | Gonner | 137/883 X |
| 4,344,456 | 8/1982 | Hostetler | 137/505.46 X |
| 4,896,629 | 1/1990 | Johnson . | |
| 5,070,903 | 12/1991 | Steudler, Jr. | 137/505.46 |
| 5,136,983 | 8/1992 | Hostetler et al. | 119/72 |
| 5,184,571 | 2/1993 | Hostetler et al. | 119/72 |
| 5,218,991 | 6/1993 | Gray | 137/505.14 X |
| 5,247,963 | 9/1993 | Hostetler et al. | 119/72 X |
| 5,429,072 | 7/1995 | Schumacher | 119/72 X |
| 5,765,588 | 6/1998 | Katz | 137/238 |
| 5,771,921 | 6/1998 | Johnson . | |

*Primary Examiner*—Stephen M. Hepperle
*Assistant Examiner*—John Bastianelli
*Attorney, Agent, or Firm*—Trexler, Bushnell, Giangiorgi & Blackstone, Ltd.

[57] ABSTRACT

A poultry drinker system includes a number of drinker lines each supplied from a common high pressure water supply through a water pressure regulator. Each regulator includes a reference spring establishing a default minimum water pressure. A centralized remote control system provides regulated low pressure air to the water pressure regulators to augment the reference spring force and remotely adjust the water pressure in the drinker lines. The remote control system periodically applies higher pressure air to the water pressure regulators to increase water pressure and flow rates and sequentially flush the drinker lines. The remote control system includes a source of high pressure air, an air pressure regulator for supplying lower pressure air and a stack of 3-way valves for applying low or high pressure air to each water pressure regulator.

15 Claims, 2 Drawing Sheets

REMOTE CONTROLLED DRINKER SYSTEM

FIELD OF THE INVENTION

The present invention relates to animal watering systems such as poultry drinker systems and more particularly to a drinker system having an improved remote control arrangement.

DESCRIPTION OF THE PRIOR ART

Drinker systems for supplying drinking water to poultry typically include an array of drinker lines, each line having numerous drinker outlets such as nipple or cup drinkers. Water is delivered to the drinker lines at a low pressure, such as a few inches of water column. A pressure regulator for each drinker line reduces the pressure of water from a common pressurized water supply and regulates the water pressure in the drinker line to maintain a predetermined level or set point. The drinker lines and regulators are arrayed around a poultry building. A spring in each regulator typically applies a force establishing the set point. The regulators are normally capable of being adjusted by changing the spring preload, but this requires the operator to go to each regulator and make the adjustment manually.

The necessity for the operator to move about the poultry floor to each regulator location in sequence to perform adjustments is time consuming, inconvenient and undesirable. The presence of humans in the poultry building may disrupt the flock. In addition, present manually controlled systems are not suited for automated control of water pressure to compensate for variables such as temperature, bird growth and the like.

Periodically the drinker system must be flushed with higher pressure water to remove stale or contaminated water or to remove water containing residual medications or nutrients. In a typical drinker system, each drinker line is connected to a normally closed flush passage that bypasses the pressure regulator supplying that line. When a flush bypass passage is opened, high pressure water flows through the corresponding drinker line and is discharged through an outlet weir. One disadvantage of this arrangement is that the control diaphragm and valve of the pressure regulator are exposed to a high pressure differential that can damage regulator components. Another disadvantage of this arrangement is that the flow passage through the regulator is not flushed when water flows through the bypass passage. The flushing operation may be accomplished using electrically operated valves in the bypass passages, but this is very expensive because in the poultry house environment the hardware including valves, wiring and electrical connectors must be highly corrosion resistant. The alternative of manually performing the flushing operation requires the operator to move about the poultry floor with the same disadvantages discussed above.

SUMMARY OF THE INVENTION

A principal object of the present invention is to provide an improved drinker system for animals such as poultry or the like. Other objects are to provide an improved drinker system with which the need for manual adjustments of dispersed system components is eliminated and the resulting inconvenience and animal disturbance is avoided; to provide a drinker system in which both normal drinker operation and periodic flush operations are controlled from a centralized remote location; to provide a drinker system suited for automated control; and to provide a drinker system overcoming disadvantages of known systems.

In brief, in accordance with the invention there is provided a drinker system for delivering water from a source of pressurized water to a plurality of drinker lines. The drinker system includes a plurality of pressure regulators each adapted to be connected between the source of pressurized water and one of the drinker lines. Each pressure regulator includes a water inlet, a water outlet and a regulating valve connected to the water inlet and providing a flow of water at a regulated reduced outlet pressure to the water outlet. Each pressure regulator further includes a movable valve control member responsive to the outlet pressure and coupled to the regulating valve for operating the regulating valve to maintain the outlet pressure at a predetermined set point. A system for establishing the set point includes a centralized control system. A plurality of air pressure conduits extend from the control system to each of the pressure regulators, and the movable control members of the regulators are responsive to air pressure supplied from the air pressure conduits. The centralized control system includes an air pressure control system for varying the air pressure in the air pressure conduits.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 1:
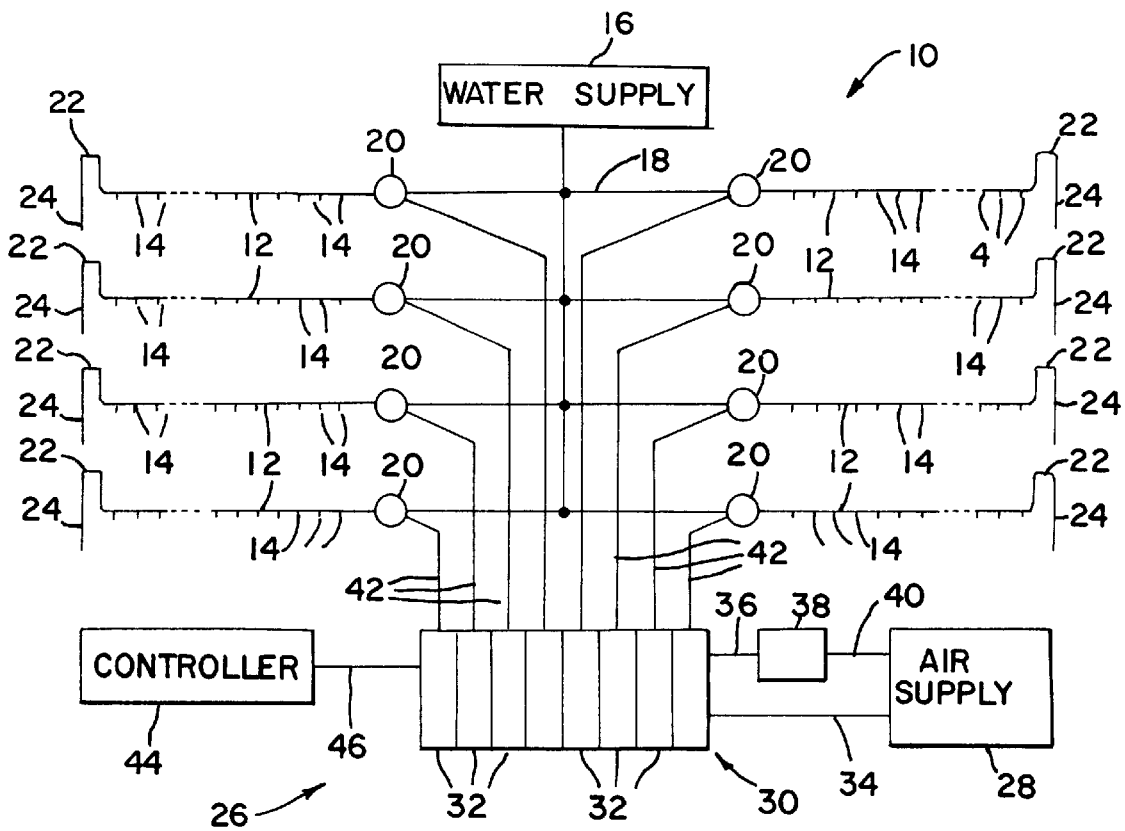
FIG. 1 is a schematic diagram of a drinker system embodying the present invention.

Having reference now to the drawings, in FIG. 1 there is illustrated a drinker system generally designated as 10 and constructed in accordance with the principles of the present invention. The illustrated drinker system 10 is a poultry watering system suitable for use as a floor bird system in a broiler house. The principles of the invention are applicable to other drinker systems such as overhead cage bird systems and watering systems for other animals and livestock.

The drinker system 10 includes a number of drinker runs or lines 12 each having numerous drinkers 14 such as nipple or cup drinkers. The drinker lines 12 are arrayed around the poultry floor of a poultry containing region or building. For example, in a typical 400 foot broiler house installation there may be eight drinker lines 12, each 200 feet in length and each having 200 nipple drinkers at one foot intervals for a total of 1,600 nipple drinkers. A common source 16 of water supplies all of the drinker lines 12 through a network 18 of water supply conduits. The source 16 supplies water at a pressure of, for example, 3 to 30 pounds per square inch (PSI) with a flow capacity of, for example, 10 gallons per minute (GPM).

For proper operation of the drinkers 14, they are supplied with water at a relatively low pressure in the range of, for example, 4 to 14 inches of water column (W.C.). In the drinker system 10, each of the drinker lines 12 is supplied with water by a dedicated water pressure regulator 20. Each water pressure regulator 20 receives relatively high pressure water from the water supply 16 and the supply network 18 and delivers water at an adjustable, regulated, relatively low pressure to its associated drinker line 12. Each drinker line 12 terminates at an overflow weir 22 leading to a water discharge outlet 24. The height of the weir may be, for example, 30 inches or so, enough to contain the relatively low pressure drinker supply water within the drinker lines 12 while permitting the drinker lines 12 to be flushed with water at a high flow rate of, for example, 6 GPM.

The water pressure regulators 20 may be connected directly to the inlets of the drinker lines 12. For example, if a standard ¾ inch polyvinyl chloride (PVC) drinker line is employed, the regulator may have an outlet fitting configured to directly accommodate this conduit size and type. Typically the water pressure regulators are dispersed at spaced locations along the center of the poultry floor.

In order to avoid the need for flush bypass passages at each regulator and in order to minimize the need for the operator to enter onto and move about the poultry floor, there is provided a centralized remote control system generally designated by the reference character 26. The control system 26 is able to remotely adjust the regulated relatively low water pressure delivered by the water pressure regulators 20 to the drinker lines 12. The control system 26 is also able to control the water pressure regulators 20 to flush the regulators 20 and the water lines 12 with relatively high pressure water.

The control system 26 includes a source 28 of pressurized air from which air is supplied at a pressure of, for example, 5 to 10 PSI. An assembly 30 of regulator control valves 32 receives pressurized air at a relatively high pressure through a conduit 34 directly from the air supply 28. The valve assembly 30 also receives air at a regulated relatively lower pressure through a conduit 36 from an air pressure regulator 38 supplied with air from the supply 28 through a conduit 40. The air pressure regulator 38 can deliver regulated air pressure in the range for example of from zero to 10 inches W.C. A number of control air pressure conduits 42 extend from the valve assembly 30 to the water pressure regulators 20. One conduit 42 extends from each regulator control valve 32 to one of the water pressure regulators 20. Each regulator control valve 32 can deliver relatively lower pressure air from the air pressure regulator 38 to operate the associated water pressure regulator to supply relatively low pressure water for normal drinker operation. Alternatively, each regulator control valve 32 can deliver relatively higher pressure air from the air supply 28 to operate the associated water pressure regulator to supply relatively high pressure water for a flushing operation. In the illustrated embodiment, a controller 44 communicates over a cable 46 with the valve assembly 30 for controlling the operation of the regulator control valves 32.

The regulator control valves are preferably 3-way valves (FIG. 2) each having a valve member 48 biased by a spring 50 to a normal position and movable by a solenoid 52 to an alternate position. The valves 32 may be assembled side by side in a stack assembly. A first continuous through passage or low pressure manifold 54 is connected to the relatively low air pressure supply conduit 36 and a second continuous through passage or high pressure manifold 56 is connected to the relatively high pressure supply conduit 34. Manifolds 54 and 56 make low and high pressure air continuously available to each of the regulator control valves 32 in the valve stack 30.

Figure 2:
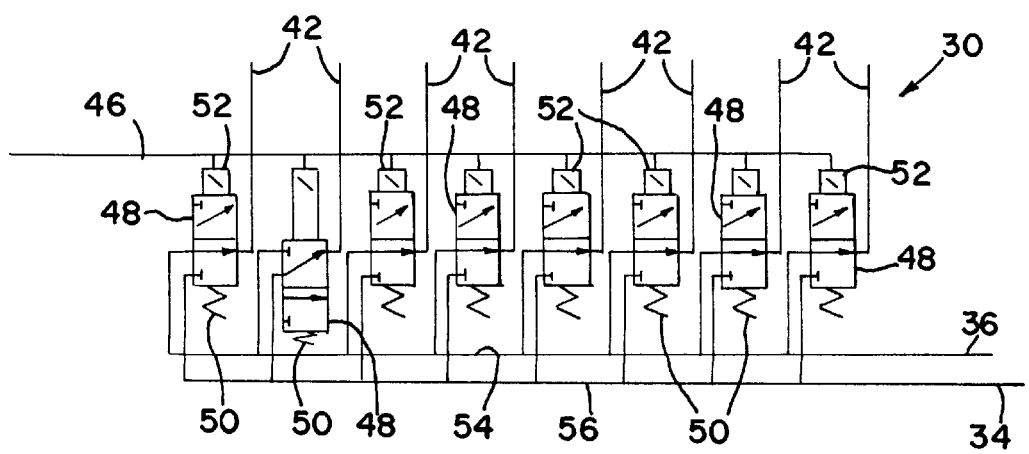
FIG. 2 is a schematic diagram of a valve stack incorporated in the centralized remote control system of the drinker system of FIG. 1.

In the normal position of each regulator control valve 32 maintained by the spring 50 the valve member 48 connects the low pressure manifold 54 to the control pressure conduit 42 extending to its associated water pressure regulator. When the solenoid 52 is energized by a signal supplied from the controller 44 over the cable 46, the valve member 48 moves to the alternate position and connects the high pressure manifold 56 to the control pressure conduit 42 and the associated water pressure regulator. When the solenoid 52 is deenergized, the valve member 48 returns to its normal position. As illustrated in FIG. 2, seven of the regulator control valves are in their normal positions, supplying low air pressure to the regulators 20 through the conduits 42. One valve 32 (the second from the left in FIG. 2) is seen in its alternate position supplying high air pressure to its corresponding regulator 20 though one of the conduits 42.

The controller 44 may be a known programmable controller, and cable 46 may contain dedicated conductors connected to each of the solenoids 52. Alternatively the controller 44 may be a computer or other source of digital control signals and the cable 46 may be in the form of a bus transmitting digital signals containing address and control information to interface units associated with the solenoids 52. Another alternative is to use manually operated valves rather than the valves 32 having solenoids 52.

Figure 3:
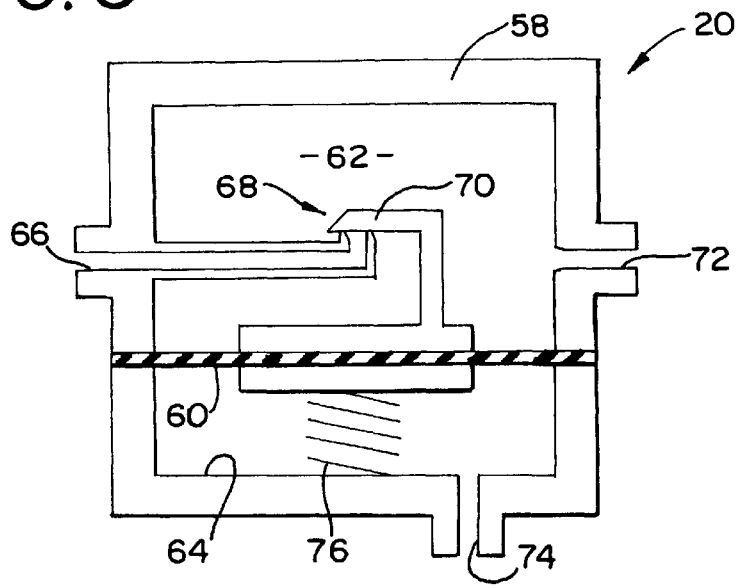
FIG. 3 is a simplified, partly diagrammatic drawing of one of the water pressure regulators of the drinker system.

FIG. 3 is a simplified and partly diagrammatic illustration of one of the water pressure regulators 20. Each regulator 20 includes a housing 58 supporting a flexible, pressure responsive diaphragm 60 that separates an outlet pressure chamber 62 from a control chamber 64 within the housing 58. An inlet port 66 connected to the water supply network 18 (FIG. 1) communicates with a regulating valve 68 including a movable valve member 70 connected to the diaphragm 60. Water flowing through the valve 68 enters the outlet pressure chamber 62 and is delivered to the associated drinker line 12 through an outlet port 72. The control chamber 64 communicates with a control port 74 connected to the corresponding air pressure control conduit 42. A reference spring 76 is held in the control chamber 64 between a rigid central portion of the diaphragm 60 and the housing 58.

The reference spring 76 applies a constant biasing force to the diaphragm 60 to establish a default, minimum set point at which the regulator 20 maintains a minimum water outlet pressure of, for example, 4 inches W.C. This minimum pressure is sufficient to operate the drinker system 10 in the event for example of interruption of the operation of the control system 26. Air pressure supplied to the control chamber 64 from the remote control system 26 applies an additional force to the diaphragm 60 that adds to the spring force and increases the set point and the regulated pressure maintained by the regulating valve 68. In normal drinker operation, as the control pressure supplied by the air pressure regulator 38 and regulator control valve 32 increases from zero to 10 inches W.C., the regulated pressure delivered through the outlet pressure chamber 62 and outlet port 72 increases from 4 to 14 inches W.C. When the corresponding valve 32 is operated to its alternate position to apply a high control pressure to the control chamber 64, the regulating valve 68 supplies an increased water flow sufficient to perform a thorough rinsing operation of the corresponding drinker line 12.

Figure 4:
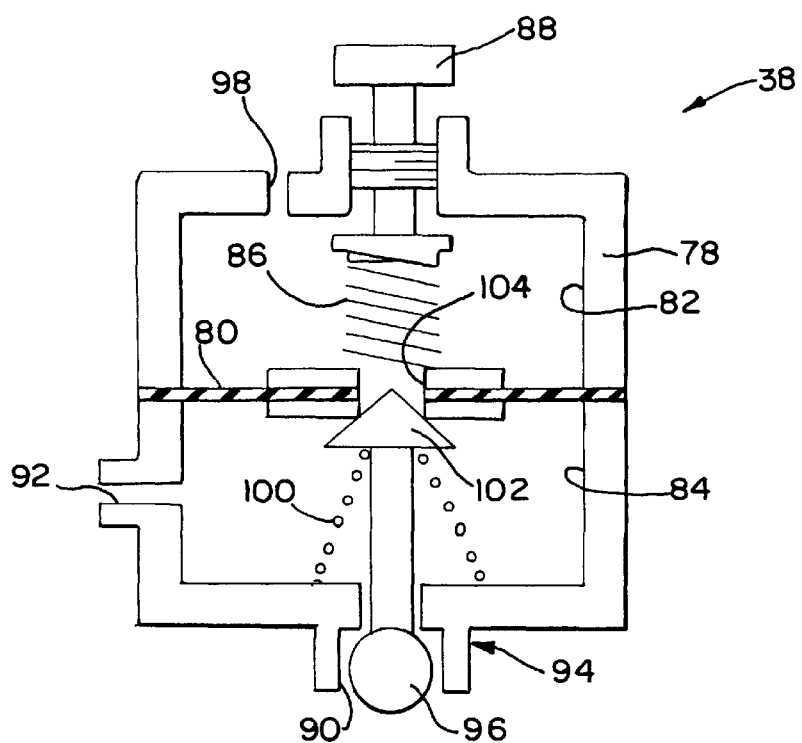
FIG. 4 is a simplified, partly diagrammatic drawing of the air pressure regulator of the drinker system.

FIG. 4 is a simplified and partly diagrammatic illustration of the air pressure regulator 38. Regulator 38 includes a housing 78 supporting a flexible, pressure responsive diaphragm 80 separating a vent chamber 82 from an outlet pressure chamber 84 within the housing 78. A spring 86 in the vent chamber 82 applies a force to the diaphragm 80, and the magnitude of the spring force is adjustable by operating a screw member 88 to vary the set point of the regulator 38 between, for example, zero and 10 inches W.C. An inlet port 90 receives pressurized air from the air supply 28 and the conduit 40 (FIG. 1) and an outlet port 92 delivers air at the set regulated pressure from the outlet pressure chamber 84 to the conduit 36 (FIG. 1) and the low pressure manifold 54 of the valve stack 30 (FIG. 2). A regulating valve 94 including a movable valve member 96 admits air from the inlet port 90 to the outlet pressure chamber 84 in sufficient quantity to maintain the set pressure.

The vent chamber 82 is vented to atmosphere through a vent port 98. A valve closing spring 100 normally holds the valve member 96 in contact with a rigid central portion of the diaphragm 80 so that the valve member 96 and diaphragm 80 move together as a unit to control the regulating operation of the regulating valve 94. The valve member 96 includes a relief valve member 102 normally closing a flow passage 104 extending through the diaphragm 80 from the outlet pressure chamber 84 to the vent chamber 82. In the event of an overpressure condition in the outlet pressure chamber 84, the diaphragm 80 flexes away from the relief valve member 102 to move the flow path 104 clear of the relief valve member 102 and vent the outlet pressure chamber 84.

In operation, normally all of the regulator control valves 32 in the valve stack 30 are in their normal positions. Each valve member 48 connects the low pressure manifold 54 to the corresponding air pressure control conduit 42 and the control chamber 64 of the corresponding water pressure regulator 20. The air pressure regulator 38 is adjusted by manipulation of the adjustment screw 88 to select a desired water pressure for delivery to the drinker lines 12. This pressure can easily be modified by readjusting the regulator 38 to compensate for changing conditions such as temperature, bird growth and the like. The operator need not enter onto the poultry floor to make water pressure adjustments. The screw member 88 can be motor driven if desired and in this case the water pressure adjustments may be made by a computer or other processor in a feedback system responsive to sensed condition changes and/or in a timer controlled system. The computer or processor functions can be supplied in common with the functions of the controller 44. In the event of loss of control pressure in the lines 40 due to a power outage or the like, the reference springs 76 in the water pressure controllers 20 maintain water pressure sufficient to assure a minimal supply of drinking water for the flock.

A periodic flush cycle is performed under the control of the controller 44. Because the capacity of the water supply 16 is normally limited, the drinker lines 12 are normally flushed in sequence rather than simultaneously. The controller 44 supplies sequential operating signals to the solenoids 52 over the cable 46. One regulator control valve 32 is operated to its alternate condition to connect the high pressure manifold 56 to the control chamber 64 of the corresponding water pressure regulator 20. The regulating valve 68 opens and admits a high volume flushing flow to the corresponding drinker line 12 at a pressure determined by the pressure in conduit 56 and the spring 76. The flush flow travels through the drinker line 12, over the weir 22 and out the discharge port 24, rinsing the flow path and removing stale and contaminated water from the drinker line 12. Because no bypass is used, the flow path through the water pressure regulator 20 is flushed as well. Because the control chamber is exposed to a relatively high pressure during the flushing operation, the diaphragm 60 and the regulating valve 68 are not exposed to a potentially damaging large pressure differential.

The regulator control valve 32 is returned to its normal position at the conclusion of the flush operation. When the valve 32 reconnects the low pressure manifold 54 to the corresponding air pressure control conduit 42 and control chamber 64, the residual high pressure remaining from the flush operation can increase the pressure in the low pressure manifold 54. This increased pressure is communicated to the outlet pressure chamber 84 of the air pressure regulator 38 and is relieved by opening of the relief valve member 102.

Each drinker line 12 is flushed in a similar manner until the flush cycle is completed. The controller 44 may be operated manually or may be timer controlled to automatically perform flush operations at regular periods.

While the present invention has been described with reference to the details of the embodiment of the invention shown in the drawing, these details are not intended to limit the scope of the invention as claimed in the appended claims.

What is claimed is:

1. A drinker system for delivering water from a source of pressurized water to a plurality of drinker lines, said system comprising:

a plurality of pressure regulators each adapted to be connected between the source of pressurized water and one of the drinker lines;

each said pressure regulator including a water inlet, a water outlet and a regulating valve connected to said water inlet and providing a flow of water at a regulated reduced outlet pressure to said water outlet;

each said pressure regulator further including a movable valve control member responsive to said outlet pressure and coupled to said regulating valve for operating said regulating valve to maintain said outlet pressure at a predetermined set point and a set point establishing system for establishing said set point;

said drinker system being characterized by:

said set point establishing system including a centralized control system;

a plurality of air pressure conduits, one extending to each of said pressure regulators from said control system, said movable control members of said regulators being responsive to air pressure supplied from said air pressure conduits;

said centralized control system including an air pressure control system for varying the air pressure in said air pressure conduits.

2. The drinker system of claim 1, said movable valve control member of each said pressure regulator comprising a diaphragm, an outlet pressure chamber at one side of said diaphragm communicating with said water outlet and a control pressure chamber at the opposite side of said diaphragm communicating with one of said air pressure conduits.

3. The drinker system of claim 2 further comprising a reference spring constantly applying a reference biasing force to said diaphragm of each said pressure regulator.

4. The drinker system of claim 1, said air pressure control system including an air pressure supply and a plurality of air supply valves connected between said air pressure supply and said plurality of air pressure conduits.

5. The drinker system of claim 4, said air pressure supply including a first air source of relatively low pressure air and a second air source of relatively high pressure air, and each of said air supply valves being operable to interconnect one of said air pressure conduits to either said first or said second air source for normal drinker operation or for drinker line flushing respectively.

6. The drinker system of claim 5, said first air source including an air pressure regulator for supplying said relatively low pressure air at a regulated pressure.

7. The drinker system of claim 6, said air pressure regulator being adjustable.

8. The drinker system of claim 5 further comprising a controller for operating said air supply valves.

9. The drinker system of claim 6, said air pressure regulator including a relief valve for venting overpressure in said first source.

10. A poultry drinker system comprising:

a source of pressurized water;

a plurality of water pressure regulators each including a housing defining an outlet pressure chamber and a control chamber, said housing having an inlet port connected to said water source and an outlet port communicating with said outlet pressure chamber;

each said water pressure regulator including a diaphragm supported by said housing and disposed between said outlet pressure chamber and said control chamber and a regulating valve between said inlet and outlet ports and coupled to said diaphragm for regulating water outlet pressure;

a plurality of drinker lines arrayed over a poultry containing region, each said drinker line extending from said outlet port of one of said pressure regulators;

each water pressure regulator including a reference bias spring applying a constant reference bias to said diaphragm to establish a reference water outlet pressure;

a remote pressurized air supply supplying a relatively high air pressure;

an air pressure regulator connected to said air supply for supplying a relatively low air pressure; and an assembly of air supply valves, one corresponding to each water pressure regulator, each said valve having a first inlet connected to said air supply, a second inlet connected to said air pressure regulator and an outlet connected to said control chamber of said corresponding water pressure valve.

11. A poultry drinker system as claimed in claim 10 further comprising a controller for operating said air supply valves.

12. A poultry drinker system as claimed in claim 10 further comprising an overpressure relief valve communicating with said second inlet of each said valve.

13. A method for controlling a plurality of pressure regulators for delivering water in a drinker system from a pressurized water source to a plurality of drinker lines, each regulator including a pressure responsive control member and a regulating valve coupled to the control member for regulating the pressure of water delivered to the outlet of the pressure regulator, said method comprising:

applying the outlet water pressure in each regulator to the control member for operating the regulating valve to maintain the outlet water pressure at a set point;

adjusting the set point of each regulator by applying air pressure to the control member of each regulator from a centralized control system; and varying the air pressure applied by the centralized control system to determine the set point.

14. The method of claim 13 wherein said varying step includes adjustably regulating air pressure from a supply of relatively high pressure air to deliver relatively low pressure air, and applying said relatively low pressure air to the control member of each regulator.

15. The method of claim 14 wherein said varying step further includes periodically interrupting the application of relatively low pressure air to the control member of a single regulator and applying relatively high pressure air to the control member of that single regulator to perform a drinker line flush operation.

* * * * *